(12) United States Patent
Nammi et al.

(10) Patent No.: US 11,196,461 B2
(45) Date of Patent: *Dec. 7, 2021

(54) CODE BLOCK GROUP CONFIGURATION WITH CODE BLOCK SEGMENTATION FOR 5G SYSTEMS

(71) Applicant: AT&T INTELLECTUAL PROPERTY I, L.P., Atlanta, GA (US)

(72) Inventors: SaiRamesh Nammi, Kista (SE); Arunabha Ghosh, Austin, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/919,169

(22) Filed: Jul. 2, 2020

(65) Prior Publication Data
US 2020/0336179 A1  Oct. 22, 2020

Related U.S. Application Data

(63) Continuation of application No. 15/587,136, filed on May 4, 2017, now Pat. No. 10,742,271.

(51) Int. Cl.
| | | |
|---|---|---|
| *H04B 7/04* | (2017.01) | |
| *H04W 4/02* | (2018.01) | |
| *H04W 84/04* | (2009.01) | |

(52) U.S. Cl.
CPC .............. *H04B 7/04* (2013.01); *H04W 4/027* (2013.01); *H04W 84/042* (2013.01)

(58) Field of Classification Search
CPC ............. H04W 72/0413; H04W 4/027; H04W 72/048; H04W 72/082; H04W 84/042; H04B 7/04
See application file for complete search history.

(56) References Cited

U.S. PATENT DOCUMENTS

| 7,724,699 B2 | 5/2010 | Baey et al. |
| 7,957,430 B2 | 6/2011 | Kashima et al. |
(Continued)

FOREIGN PATENT DOCUMENTS

| CN | 103259634 B | 2/2016 |
| JP | 2004312687 A | 11/2004 |
(Continued)

OTHER PUBLICATIONS

Ikuno et al., "LTE rate matchingperformance with code block balancing.",Wireless Conference 2011—Sustainable Wireless Technologies (European Wireless), 2011, 3 pages.
(Continued)

*Primary Examiner* — Harry H Kim
(74) *Attorney, Agent, or Firm* — Amin, Turocy & Watson, LLP

(57) ABSTRACT

Various embodiments disclosed herein provide for a codeblock segmentation configuration system. A base station can configure the segmentation rate or segment size, which can control the number of codeblock segments a transport block is segmented into, based on the transmission reliability and predicted interference to a mobile device. An increased number of segments can improve throughput and efficiency when interference is low and signal to noise ratios are high, but can increase latency when interference is high and signal to noise is low. The base station can determine or predict transmission reliability based on the speed of mobile devices, the location and/or distance to the mobile device, as well as the long term signal to noise ratios.

20 Claims, 10 Drawing Sheets

(56) References Cited

U.S. PATENT DOCUMENTS

| | | |
|---|---|---|
| 8,238,374 B2 | 8/2012 | Xu et al. |
| 8,537,750 B2 | 9/2013 | Jin et al. |
| 8,634,366 B2 | 1/2014 | Kim et al. |
| 8,856,609 B2 | 10/2014 | Vummintala et al. |
| 8,861,628 B2 | 10/2014 | Roh et al. |
| 9,148,375 B2 | 9/2015 | Ramamurthi et al. |
| 9,374,184 B2 | 6/2016 | Pajukoski et al. |
| 9,590,765 B2 | 3/2017 | Pi et al. |
| 9,602,235 B2 | 3/2017 | Roh et al. |
| 2006/0203727 A1* | 9/2006 | Aizawa ............... H04L 1/0033 370/235 |
| 2009/0122753 A1 | 5/2009 | Hughes et al. |
| 2009/0219911 A1* | 9/2009 | Blankenship ........... H04L 27/34 370/345 |
| 2011/0134848 A1* | 6/2011 | Tamaki ................ H04W 28/22 370/328 |
| 2012/0127947 A1* | 5/2012 | Usui ....................... H04W 4/02 370/329 |
| 2012/0287912 A1* | 11/2012 | Suzuki ................ H04L 1/0015 370/332 |
| 2014/0342748 A1* | 11/2014 | Zou ....................... H04W 28/16 455/452.1 |
| 2015/0381209 A1* | 12/2015 | Roh .................... H03M 13/618 714/755 |
| 2016/0065995 A1* | 3/2016 | Phillips ................ H04L 1/0014 725/62 |
| 2016/0073318 A1* | 3/2016 | Aguirre ................ H04W 36/32 455/436 |
| 2016/0285775 A1* | 9/2016 | Damnjanovic ... H04W 28/0278 |
| 2016/0295516 A1* | 10/2016 | Su ....................... H04W 52/228 |
| 2017/0026297 A1 | 1/2017 | Sun et al. |
| 2017/0141903 A1* | 5/2017 | Xu ........................ H04L 1/0005 |
| 2017/0290034 A1* | 10/2017 | Desai .................... H04W 4/027 |
| 2017/0331591 A1* | 11/2017 | Nammi ................. H04L 1/0061 |
| 2018/0139023 A1* | 5/2018 | Li .......................... H04L 5/0053 |
| 2018/0324740 A1* | 11/2018 | Edge ................. H04W 12/0431 |

FOREIGN PATENT DOCUMENTS

| | | |
|---|---|---|
| JP | 2006203355 A | 8/2006 |
| KR | 20140134207 A | 11/2014 |
| WO | 2016195754 A1 | 12/2016 |

OTHER PUBLICATIONS

Choi et al., "Dynamic segment sizeadjustment for TCP performance in cellular networks." Consumer Electronics 2005, IEEE, 3 pages.

Final Office Action received for U.S. Appl. No. 15/587,136 dated Nov. 19, 2019, 30 pages.

Non-Final Office Action received for U.S. Appl. No. 15/587,136 dated Jun. 25, 2019, 28 pages.

Final Office Action received for U.S. Appl. No. 15/587,136 dated Mar. 1, 2019, 40 pages.

Non-Final Office Action received for U.S. Appl. No. 15/587,136 dated Aug. 22, 2018, 38 pages.

* cited by examiner

CODE BLOCK GROUP CONFIGURATION WITH CODE BLOCK SEGMENTATION FOR 5G SYSTEMS

RELATED APPLICATION

The subject patent application is a continuation of, and claims priority to, U.S. patent application Ser. No. 15/587,136, filed May 4, 2017, and entitled "CODE BLOCK GROUP CONFIGURATION WITH CODE BLOCK SEGMENTATION FOR 5G SYSTEMS," the entirety of which application is hereby incorporated by reference herein.

TECHNICAL FIELD

The present application relates generally to the field of mobile communication and, more specifically, to retransmitting codeblocks that have been segmented in a next generation wireless communications network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
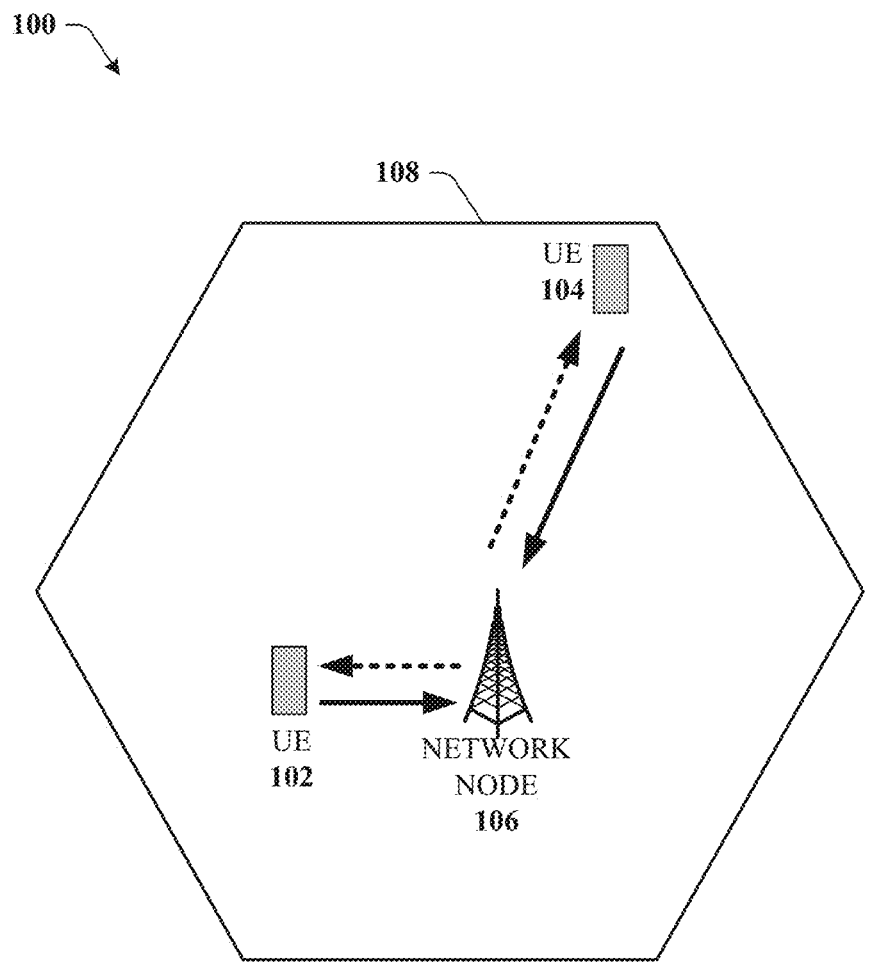
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for a dynamic configuration of a codeblock segmentation system based on a variety of factors that may affect and cause interference with a transmission. A base station can configure the segmentation rate or size, which can control the number of codeblock segments a transport block is segmented into, based on the transmission reliability and predicted interference to a mobile device. An increased number of segments can improve throughput and efficiency when interference is low and signal to noise ratios are high, but can increase latency when interference is high and signal to noise is low. The base station can determine or predict transmission reliability based on the speed of mobile devices, the location and/or distance to the mobile device, as well as the long term signal to noise ratios. In other embodiments, the base station can measure and/or predict the interference per antenna in a multi antenna transmitter, where each antenna may have respective codeblock segmentation rates. In other embodiments, the base station can set segmentation rates for multiplexed transmissions that incorporate high priority emergency transmissions.

In various embodiments, a base station device can comprise a processor and a memory that stores executable instructions that, when executed by the processor facilitate performance of operations. The operations can comprise determining a transmission reliability value representative of a transmission reliability for a transmission of a transport block to a mobile device. The operations can also include determining a codeblock segmentation rate based on the transmission reliability value, wherein the codeblock segmentation rate indicates a number of codeblock segments in a codeblock group. The operations can also comprise segmenting the transport block into a group of codeblock segments based on the codeblock segmentation rate. The operations can also comprise facilitating transmitting the group of codeblock segments to the mobile device.

In another embodiment, method comprises determining, by a device comprising a processor, a segmentation size based on a predicted transmission reliability, wherein the segmentation size is associated with a size of a codeblock segment. The method can also comprise segmenting, by the device, a transport block into a group of codeblock segments based on the segmentation size. The method can also comprise transmitting, by the device, the group of codeblock segments to a mobile device.

In another embodiment machine-readable storage medium, comprising executable instructions that, when executed by a processor of a device, facilitate performance of operations. The operations can comprise determining a segmentation size for a transmission to a mobile device as a function of a speed of the mobile device, a location of the mobile device, and a signal to interference plus noise measurement associated with the mobile device, wherein the segmentation size is associated with a size of a codeblock segment. The operations can also comprise segmenting a transport block into codeblock segments based on the segmentation size. The operations can also comprise facilitating transmitting the codeblock segments to the mobile device.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

Figure 2:
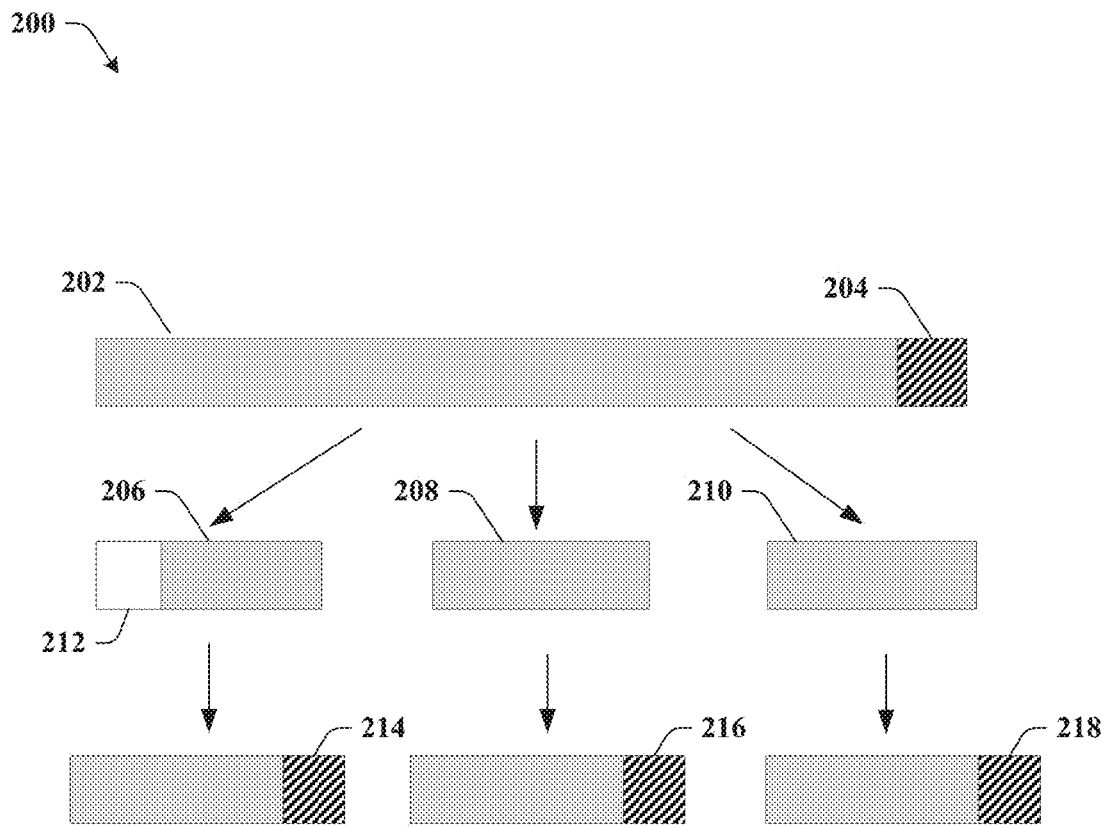
FIG. 2 illustrates an example block diagram showing codeblock segmentation in accordance with various aspects and embodiments of the subject disclosure.

Turning now to FIG. 2, illustrated is an example block diagram 200 showing codeblock segmentation in accordance with various aspects and embodiments of the subject disclosure.

In 5G systems or NR (New Radio) for data transmission, a transport block 202 can be encoded using a low density parity check (LDPC) code. In the first step of the physical-layer processing, an M-bit CRC 204 is calculated for and appended to each transport block. The CRC 204 allows for receiver-side detection of errors in the decoded transport block. The corresponding error indication can, for example, be used by the downlink hybrid-ARQ protocol as a trigger for requesting retransmissions. If the transport block 202, including the transport-block CRC 204, exceeds the maximum code-block size of 8192 bits, code-block segmentation is applied before the LDPC coding. Code-block segmentation means that the transport block is segmented into smaller code blocks (e.g., code blocks 206, 208, and 210), the sizes of which should match the set of code-block sizes supported by the LDPC coder. In order to ensure that a transport block of arbitrary size can be segmented into code blocks that match the set of available code-block sizes, the specification includes the possibility to insert "dummy" filler bits 212 at the head of the first code block 206.

In an embodiment, the transmitter can then add CRC bits 214, 216, and 218 to each of the codeblock segments 206, 208, and 210 so that a receiver can determine whether any of the individual codeblock segments have been corrupted during transmission. For instance, if codeblock segment 206 is corrupted, when the receiver performs a parity check on CRC bits 214, the receiver can determine that the codeblock segment 206 contains an error, and the receiver can request a retransmission.

In an embodiment, transmissions between the network node (e.g., base station device, or gNB (gNodeB in 5G)) 106 and the mobile devices 102 and 104 can have errors introduced due to poor signal to interference plus noise ratios, interference, passive intermodulation, and other factors which can cause one or more of the codeblock segments to contain errors, which would require retransmission.

As an example, mobile device 104 is further away from the network node 106 than is mobile device 102. If the transport block 202 is split into 3 segments for a transmission to a mobile device 104, then a transmission to mobile device 102 may contain 4 or 5 or a greater number of segments, since a transmission to mobile device 102 is less likely to contain errors.

In other embodiments, mobile devices moving faster (e.g., having a higher doppler frequency shift) relative to the network node can also have increased errors. Similarly, mobile devices with connections to the network node that have lower signal to interference plus noise ratios can also have lower transmission reliabilities.

In multi-antenna transmitters and receivers, depending on the frequency of the transmission, or location of the mobile device relative to the transmitter, different antennas of the multiantenna transmitter can be more or less likely to have codewords containing errors due to passive or active intermodulation and other interference effects. Accordingly, codewords and transport blocks transmitted by respective antennas can have different segmentation rates.

Figure 3:
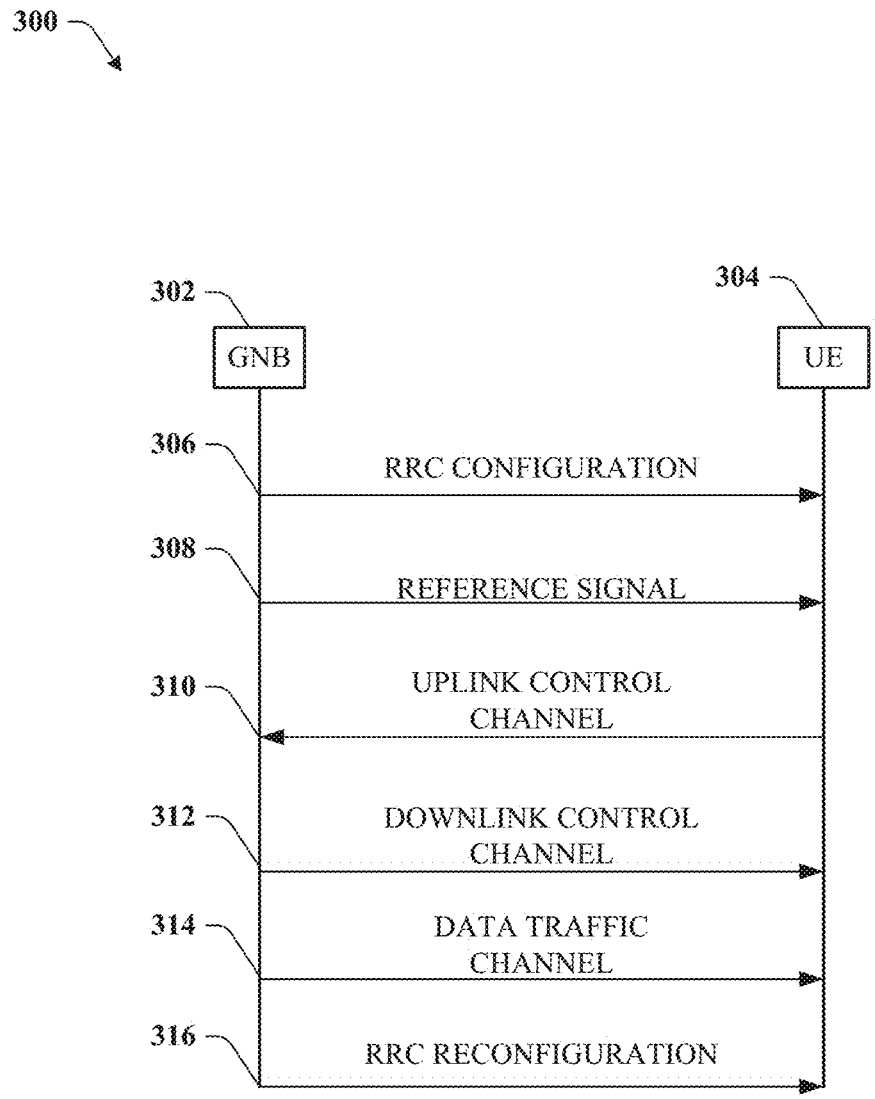
FIG. 3 illustrates an example block diagram showing a message sequence chart in accordance with various aspects and embodiments of the subject disclosure.

Turning now to FIG. 3, illustrated is an example block diagram 300 showing a message sequence chart in accordance with various aspects and embodiments of the subject disclosure.

In an embodiment, the message sequence chart can start at 306 where the base station device or gNB 302 remotely configures the UE 304. At the beginning of a cycle, or when a mobile device (e.g., mobile device 304) connects to the network, the gnB 302 remotely configures via a Radio Resource Control (RRC) protocol, the mobile device 304 to use a predetermined segmentation rate. The RRC protocol is a layer that exists between the UE 304 and the gNB 302 at the IP level. The major functions of the RRC protocol include connection establishment and release functions, broadcast of system information, radio bearer establishment, reconfiguration and release, RRC connection mobility procedures, paging notification and release and outer loop power control. By means of the signaling functions, the RRC configures the user and control planes according to the network status and allows for Radio Resource Management strategies to be implemented.

At 308 the gNB 302 sends a reference signal which are beamformed or non-beamformed and are such that the UE 304 can computes the channel estimates then computes the parameters needed for channel state information (CSI) reporting. The CSI report consists of for example channel quality indicator (CQI), preceding matrix index (PMI), rank information (RI), the best sub band indices, best beam indices etc.

The CSI report is sent back to the gNB 302 on an uplink control channel 310, and based on the CSI report, the gNB 302 can provide downlink control information on downlink control channel 312 that provides scheduling and other parameters for the data traffic transmission on data traffic channel 314.

In response to measuring the interference, determining transmission errors, and other factors affecting the transmission reliability and likelihood of interference errors, the gNB 302 than reconfigures the RRC at 316 with new segmentation rates. After every cycle or every predefined period, the gNB 302 can perform RRC reconfiguration based on the current conditions. Thus, the segmentation rates and corresponding segment sizes for transmissions between the base station and the mobile devices can vary over time. It is to be appreciated that each mobile device connected to the gNB 302 can have respective segmentation rates based on the conditions affecting transmissions between the gNB 302 and that particular mobile device.

It is also to be appreciated that for each mobile device, the uplink and downlink communications can have different codeblock segmentation rates. For instance, there could be increased interference on a downlink, while there could be relatively lower interference on an uplink. During the RRC reconfiguration, the gNB 302 can configure the mobile device 304 to have a higher segmentation rate (smaller segment size) than the gNB 302 will use for downlink communications.

Figure 4:
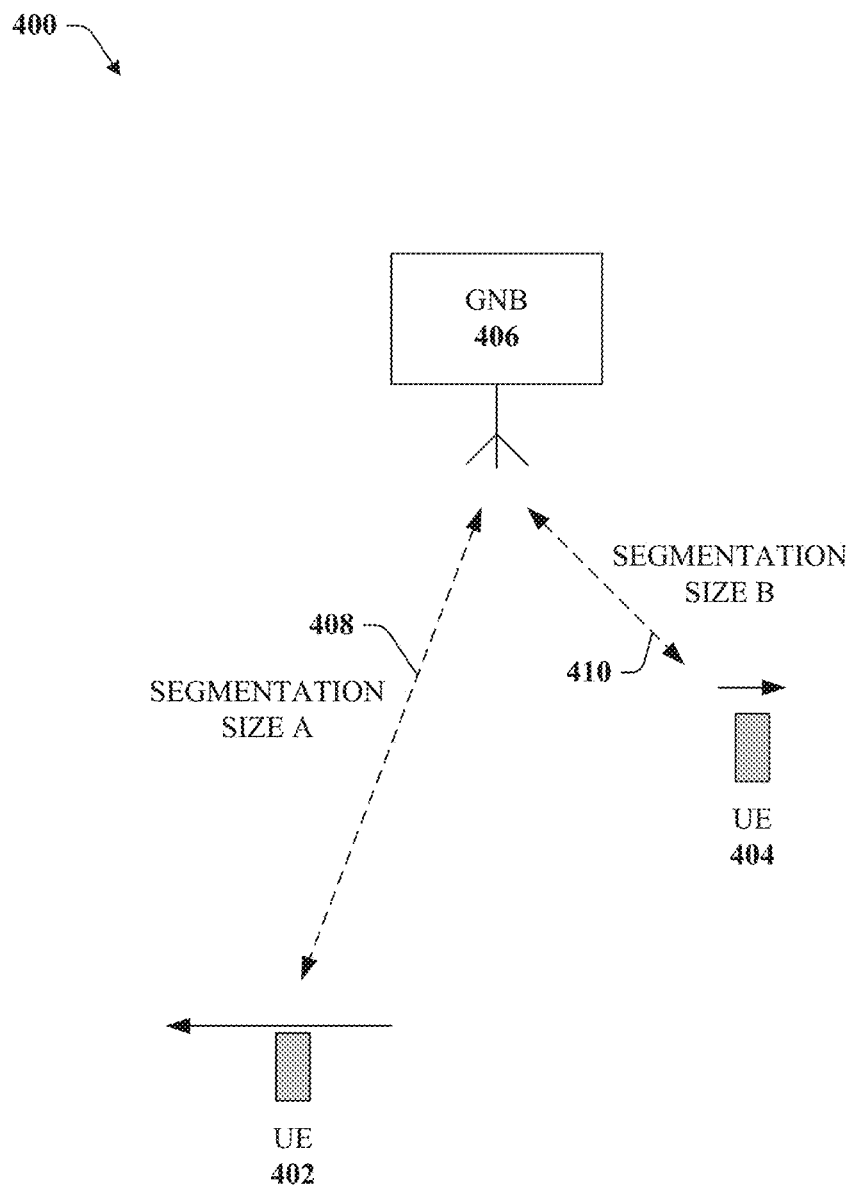
FIG. 4 illustrates an example block diagram showing varied segmentation rates based on transmission reliability factors in accordance with various aspects and embodiments of the subject disclosure.

Turning now to FIG. 4, illustrated is an example block diagram 400 showing varied segmentation rates based on transmission reliability factors in accordance with various aspects and embodiments of the subject disclosure.

In an embodiment, after performing an initial RRC configuration and transmission cycle 306 to 314 as shown in FIG. 3, the gNB 406 (base station 406) can adjust segmentation rates for various mobile devices based on the various factors affecting transmission reliability and error rates requiring codeblock retransmission. UEs 402 and 404 can have respective segmentation rates (e.g., segment sizes) based on their respective conditions.

As an example, UE 402 can be moving at a high speed (e.g., in a car, train, etc.) and thus have a high doppler frequency which can introduce errors into transmissions. The base station 406 can determine the speed of the UE 402 and 404 using a variety of means. In one embodiment, the UE can send channel state information and the doppler frequency can be determined from the channel state information and measurement reports (variation in frequencies measured and the predetermined frequencies). In other embodiments, the channel quality indicator (CQI) can vary over time which can indicate movement of the mobile device. In other embodiments, the UE 402 and 404 can send an indication of the speed (as measured by the UEs) to the network. The UEs 402 and 404 can measure their own speed using network location, GPS, accelerometer information, and other sensor data.

In an embodiment, the mobile devices 402 and 404 can have different speeds, with mobile device 404 moving more slowly. Accordingly, segmentation size A for a transmission 408 from gNB 406 to mobile device 402 can be larger than the segmentation size B for transmission 410 to mobile device 404. With the larger segmentation size, the transport blocks are segmented into fewer segments, which decreases the latency for transmission more likely to experience interference.

In a similar manner, since mobile device 404 is closer to gNB 406, the segmentation size B for transmission 410 can be smaller than segmentation size A for transmission 408 since transmission 410 is likely to have fewer transmission errors than transmission 408. Mobile devices that are closer to the base station are likely to have stronger signal to interference plus noise ratios and so can have higher segmentation rates (e.g., lower segment sizes) than mobile devices further away.

Distance is not the only consideration however, as a location in a cell may suffer from increased interference due to buildings causing interference, topography, and interference from other base stations. Accordingly, some locations may have increased interference than other locations that are further away, and so base stations can take the location, and not just the distance of the mobile devices into consideration. Mobile devices that have coordinates (determined by either network location or GPS) that fall in a specified range or within a geofence, can have predetermined segmentation rates that are appropriate for conditions at that location.

In other embodiments, the base station device can measure the long term signal to interference plus noise ratios of the mobile devices (e.g., for one cycle or averaged over a period of cycles) and base the segmentation rates off the long term SINR. SINRs falling below a predetermined threshold can trigger different levels of segmentation rates.

In an embodiment, the gNB 406 can take each of these factors (e.g., location, distance, speed, SINR) into consideration, either separately or together, when determining the segmentation rate. In some embodiments, the gNB 406 can weight one factor higher than the other factors, assigning a score to each factor wherein a combined score is used to determine the segmentation rate. In other embodiments, just one or more of the factors can be taken into consideration.

It is also to be appreciated that while the embodiments described herein have been described in relation to codeblock segmentation configuration from the network node/base station to the UE, the same principles can also be applied to uplink codeblock segmentation and side link systems. Similarly, note that for simplicity we use the radio network node or simply network node is used for gNB. It refers to any type of network node that serves UE and/or connected to other network node or network element or any radio node from where UE receives signal. Examples of radio network nodes are Node B, base station (BS), multi-standard radio (MSR) node such as MSR BS, gNB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Figure 5:
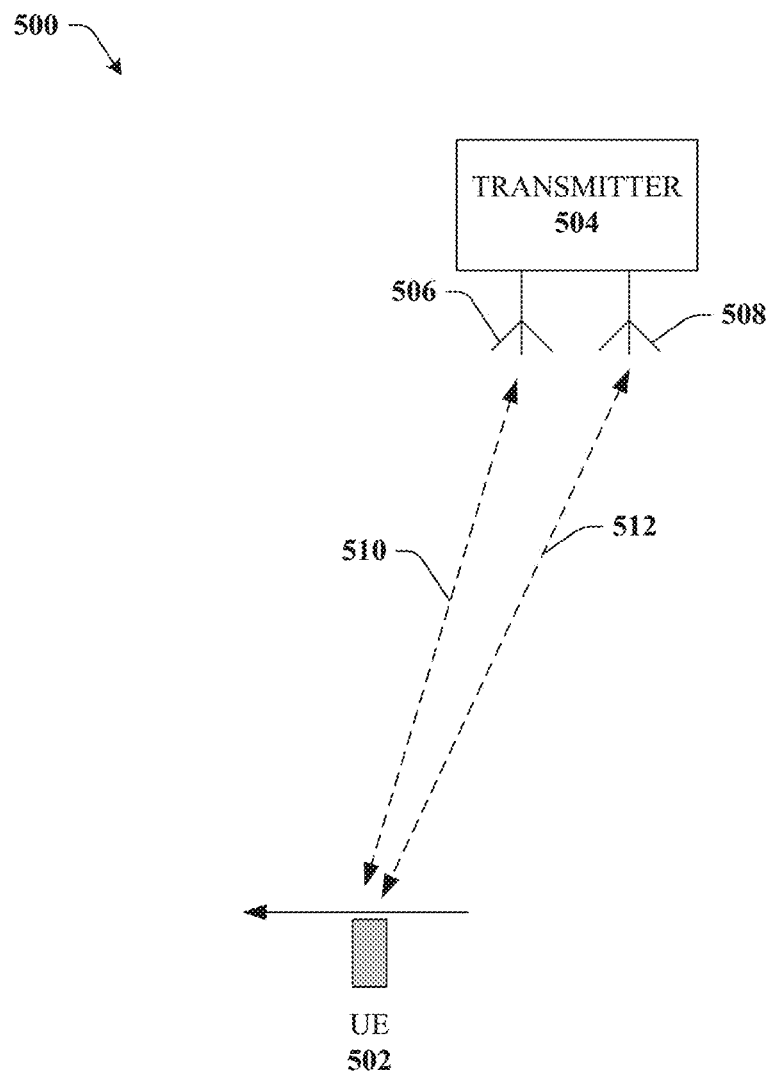
FIG. 5 illustrates an example block diagram showing varied segmentation rates based using multiple input, multiple output (MIMO) antennas in accordance with various aspects and embodiments of the subject disclosure.

Likewise, for reception we use the term user equipment (UE). It refers to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports are also interchangeably used but carry the same meaning in this disclosure Turning now to FIG. 5, illustrated is an example block diagram 500 showing varied segmentation rates based using MIMO antennas in accordance with various aspects and embodiments of the subject disclosure.

In a MIMO transceivers, depending on the frequency of the transmission, or location of the mobile device relative to the transmitter, different antennas of the MIMO transceiver can be more or less likely to have codewords containing errors due to passive or active intermodulation and other interference effects. Accordingly, codewords and transport blocks transmitted by respective antennas can have different segmentation rates.

As an example, transmitter 504 can have at least two antennas (e.g., antenna 506 and antenna 508. For MIMO transmissions 510 and 512 from transmitter 504 to mobile device 502, the transmissions 510 and 512 can experience different and varying degrees of interference due to the design of the antennas, transmitter housings, location of the mobile device 502, and etc. Accordingly, codewords transmitted by antenna 506 may experience more errors than codewords transmitted by antenna 508, and so the network can measure the error rates, and assign different codeblock segmentation rates to antennas 506 and 508 respectively.

In an embodiment, a first group of antennas (e.g., up to four) can be associated with four independent layers that collectively transport a codeword that is segmented into a group of codeblock segments. A second group of antennas (e.g., 5-8) can transmit another codeword that is associated with an additional set of independent layers 5-8 and is segmented into another codeblock group. Each additional set of antennas can be associated with another codeword and codeblock group that can each have separate codeblock segmentation rates.

Figure 6:
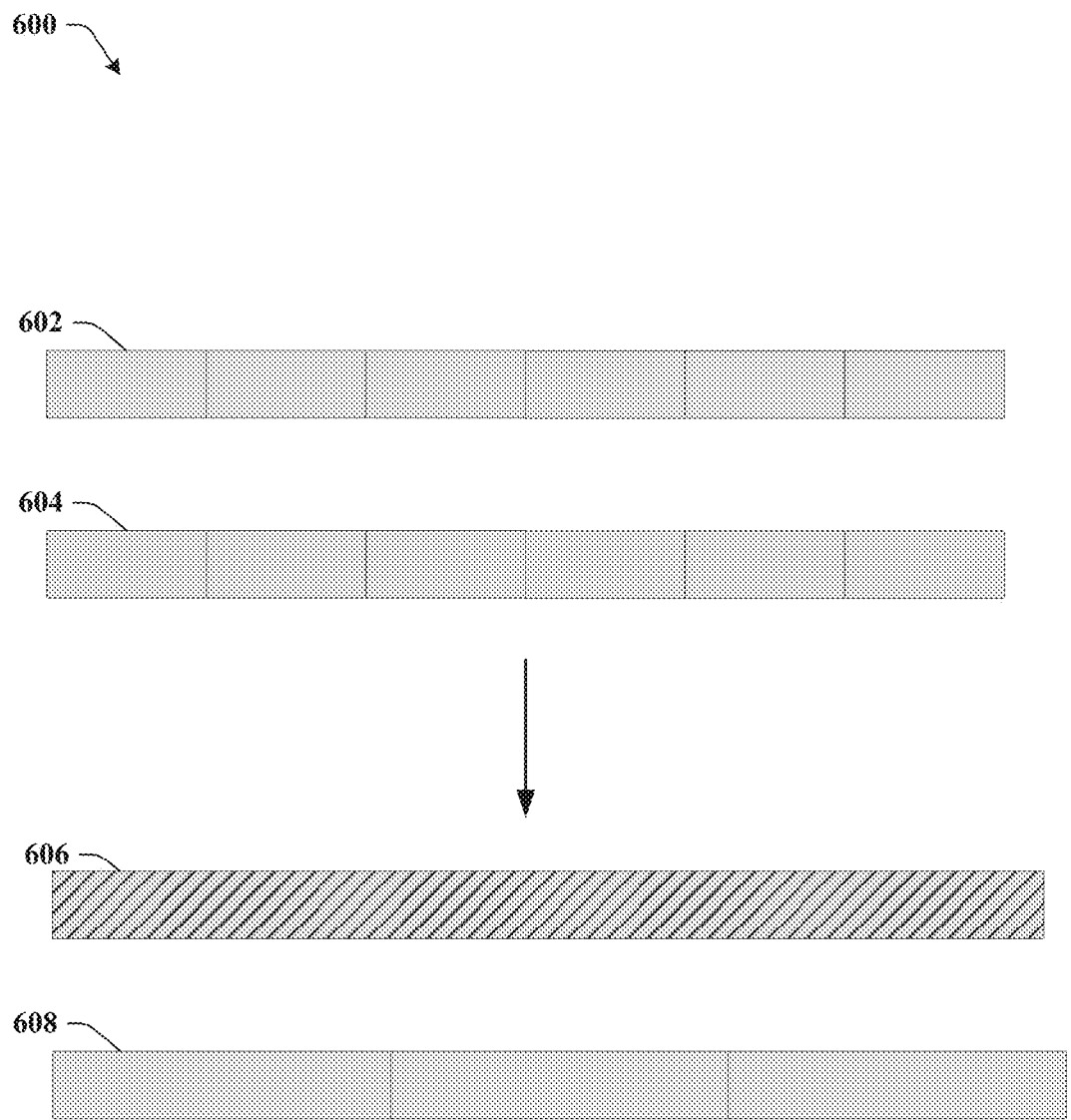
FIG. 6 illustrates an example block diagram showing varied segmentation rates in accordance with various aspects and embodiments of the subject disclosure.

Turning now to FIG. 6, illustrated is an example block diagram 600 showing varied segmentation rates in accordance with various aspects and embodiments of the subject disclosure. In an embodiment, transmitters can multiplex codewords, transmitting different codewords and codeblock segments at the same time. One of the multiplexed transmissions has the ability to cause interference on the other channel, and so the base station can take into account the codewords being transmitted on each channel when setting segmentation rates. Each of the different channels can have different segmentation rates as well.

In an embodiment, if a base station schedules a series of transport blocks for transmission, the base station can set segmentation rates for each channel and for each transport block. Due to the 5G standard however of low latency and high priority URLLC (Ultra-Reliable Low Latency Communications) transmissions, which can take precedence over regular enhanced mobile broadband data, the base station can adjust segmentation rates as needed.

As an example, for a first frame, codewords 602 and 604 can have a first segmentation rate, but in a second frame, where URLLC data 606 takes precedence, and may cause increased interference for the codeword 608, the base station can lower the segmentation rate (increased segment size) for codeword 608 relative to the segmentation rate for codewords 602 and 604.

Figure 7:
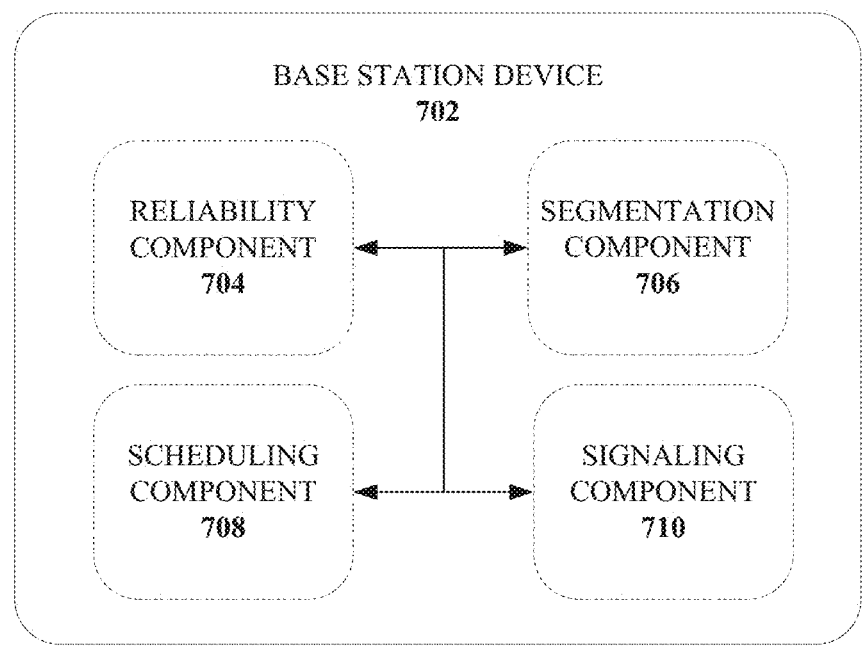
FIG. 7 illustrates an example block diagram showing a base station device in accordance with various aspects and embodiments of the subject disclosure.

Turning now to FIG. 7, illustrated is an example block diagram 700 showing a base station device 702 in accordance with various aspects and embodiments of the subject disclosure The base station device 502 can include a reliability component 704 that determines a transmission reliability for a transmission of a transport block to a mobile device. The reliability component 704 can take each of the factors affecting transmission reliability (e.g., location, distance, speed, SINR) into consideration, either separately or together, when determining the segmentation rate. In some embodiments, the reliability component 704 can weight one factor higher than the other factors, assigning a score to each factor wherein a combined score is used to determine the segmentation rate. In other embodiments, just one or more of the factors can be taken into consideration.

The base station device 702 can also include a segmentation component 706 that segments transport blocks into codeblock segments based on the segmentation rate. The signaling component 710 can transmit the segmentation rate to the mobile device during a RRC reconfiguration period after the base station device 702 determines the reliability factors. The signaling component 710 can reconfigure the segmentation rate every frame or at predefined intervals, or whenever conditions are determined to have changed.

The base station device can also include a scheduling component 708 that schedules transport blocks and also informs the reliability component 704 of whenever a URLLC transport block is required to be sent, which can cause changes in the segmentation rate.

Figure 8:
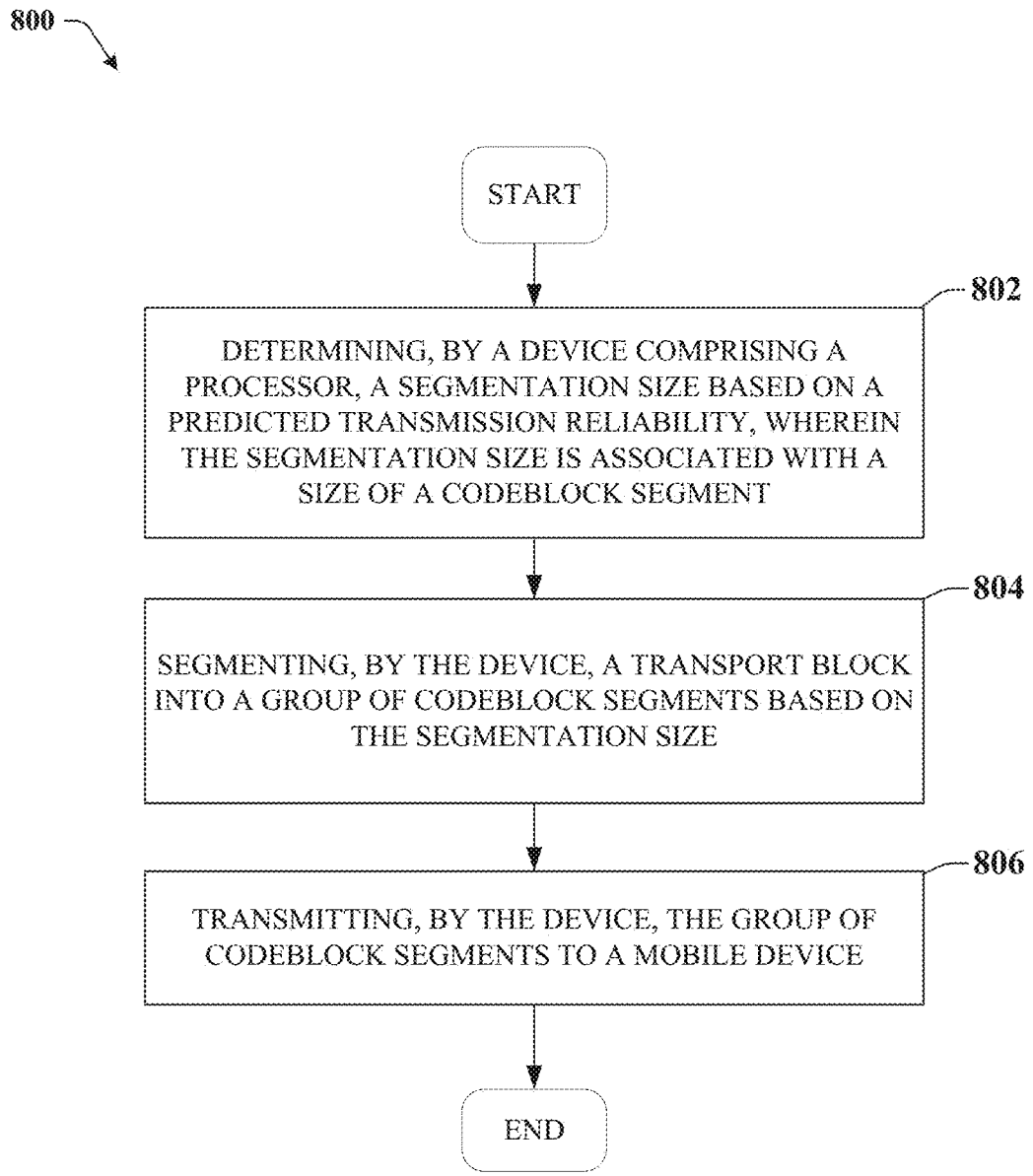
FIG. 8 illustrates an example method for configuring segmentation rates in accordance with various aspects and embodiments of the subject disclosure.

FIG. 8 illustrates a process in connection with the aforementioned systems. The process in FIG. 8 can be implemented for example by the systems in FIGS. 1-7 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 8 illustrates an example method 800 for configuring segmentation rates in accordance with various aspects and embodiments of the subject disclosure.

Method 800 can begin at 802 wherein the method includes determining, by a device comprising a processor, a segmentation size based on a predicted transmission reliability, wherein the segmentation size is associated with a size of a codeblock segment.

At 804, the method can include segmenting, by the device, a transport block into a group of codeblock segments based on the segmentation size.

At 806, the method can include transmitting, by the device, the group of codeblock segments to a mobile device.

Figure 9:
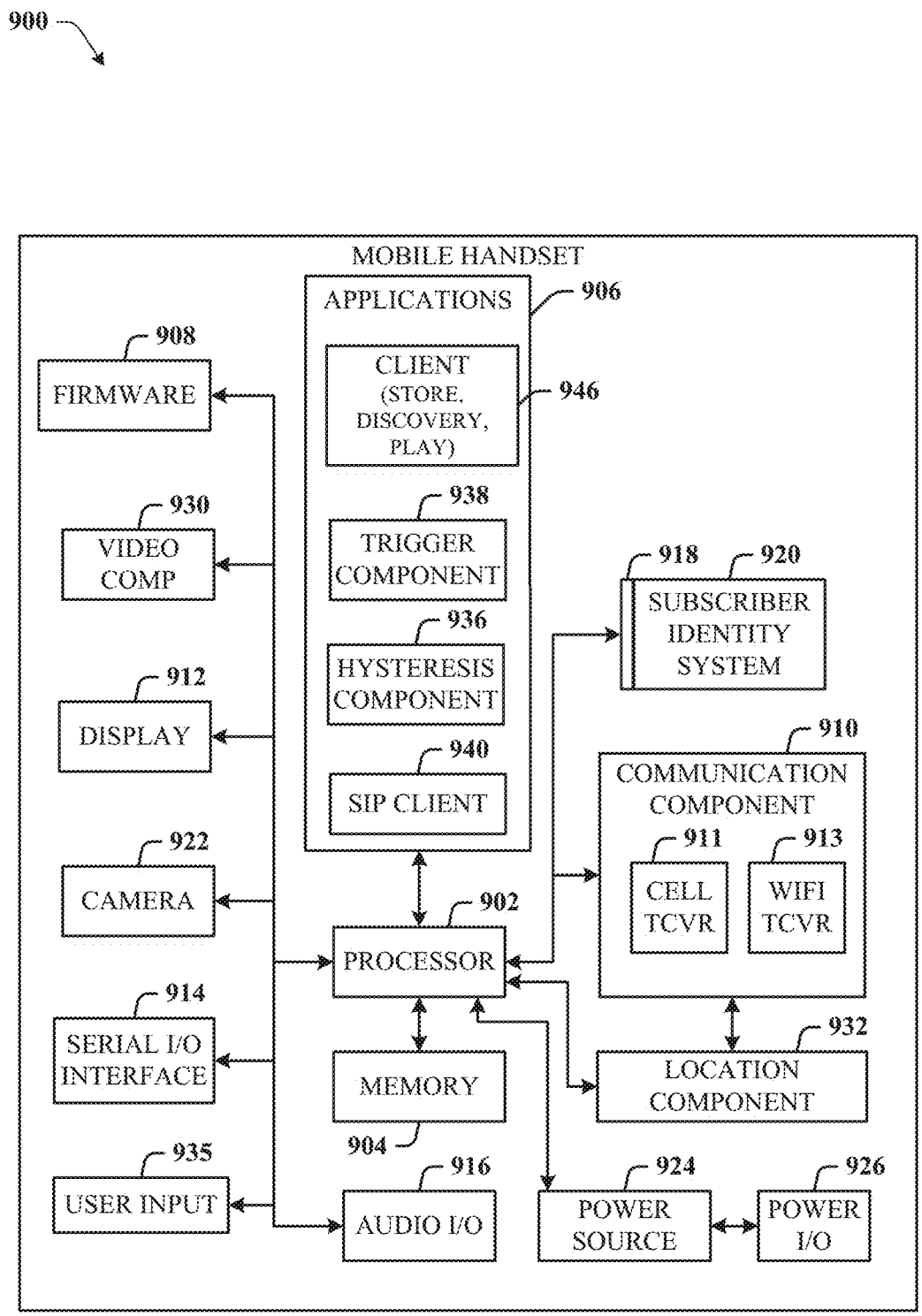
FIG. 9 illustrates an example block diagram of an example user equipment that can be a mobile handset operable to provide a format indicator in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
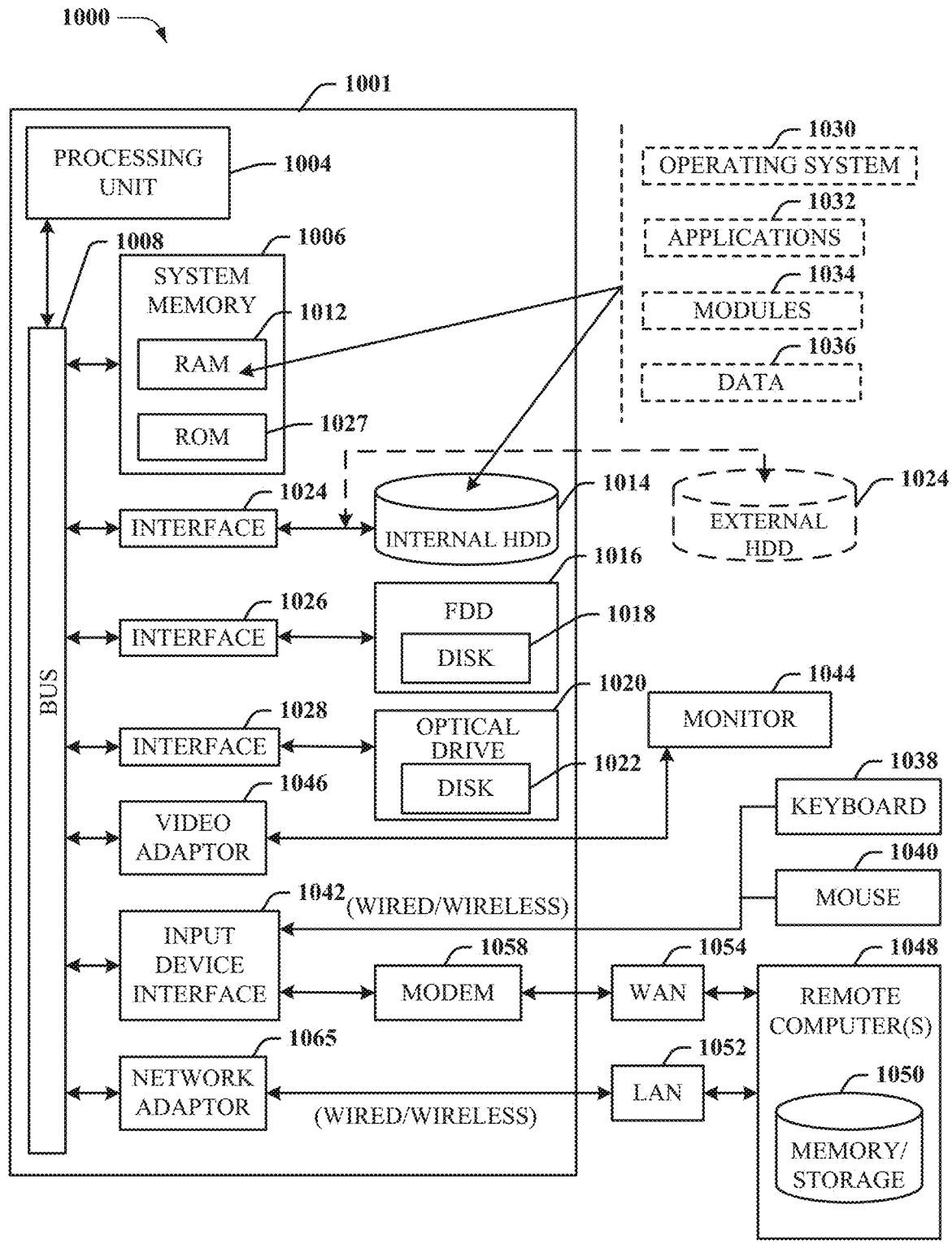
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 406) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
   in response to detecting that a location of a user equipment is within a defined geographic area having predetermined codeblock segmentation sizes respectively defined for different conditions within the defined geographic area, determining, by network equipment comprising a processor, a codeblock segmentation size of the predetermined codeblock segmentation sizes assigned to a current condition, of the different conditions, in the defined geographic area; and
   transmitting, by the network equipment, a group of codeblock segments to the user equipment, wherein the group of codeblock segments corresponds to a transport block segmented based on the codeblock segmentation size.

2. The method of claim 1, further comprising:
   transmitting, by the network equipment, an indication of the codeblock segmentation size to the user equipment.

3. The method of claim 1, further comprising:
   determining, by the network equipment, the codeblock segmentation size further based on a distance of the user equipment from the network equipment.

4. The method of claim 1, further comprising:
   determining, by the network equipment, the codeblock segmentation size further based on a signal to interference plus noise measurement associated with the user equipment.

5. The method of claim 1, further comprising:
   determining, by the network equipment, the codeblock segmentation size further based on a speed of movement of the user equipment.

6. The method of claim 1, further comprising:
   determining, by the network equipment, the codeblock segmentation size further based on channel state information received from the user equipment.

7. The method of claim 1, further comprising:
   determining, by the network equipment, the current condition in the defined geographic area.

8. Network equipment, comprising:
a processor; and
a memory that stores executable instructions that, when executed by the processor, facilitate performance of operations, comprising:
  in response to determining that a location of a user equipment is within a geofenced area having predetermined codeblock segmentation rates respectively defined for various conditions within the geofenced area, determining a codeblock segmentation rate of the predetermined codeblock segmentation rates assigned to a current condition, of the various conditions, in the geofenced area; and
  transmitting a group of codeblock segments to the user equipment, wherein the group of codeblock segments corresponds to a transport block segmented based on the codeblock segmentation rate.

9. The network equipment of claim 8, wherein the operations further comprise:
  transmitting an indication of the codeblock segmentation rate to the user equipment.

10. The network equipment of claim 8, wherein the operations further comprise:
  determining the codeblock segmentation rate further based on a distance of the user equipment from the network equipment.

11. The network equipment of claim 8, wherein the operations further comprise:
  determining the codeblock segmentation rate further based on a signal to interference plus noise measurement associated with the user equipment.

12. The network equipment of claim 8, wherein the operations further comprise:
  determining the codeblock segmentation rate further based on a speed of movement of the user equipment.

13. The network equipment of claim 8, wherein the operations further comprise:
  determining the codeblock segmentation rate further based on channel state information received from the user equipment.

14. The network equipment of claim 8, wherein the operations further comprise:
  determining the current condition in the geofenced area.

15. A non-transitory machine-readable medium, comprising executable instructions that, when executed by a processor of network equipment, facilitate performance of operations, comprising:
  in response to determining that current geographic coordinates of a user equipment are within a defined area having predetermined codeblock segmentation rates respectively defined for defined conditions within the defined area, determining a codeblock segmentation rate of the predetermined codeblock segmentation rates assigned to a current condition, of the defined conditions, in the defined area; and
  transmitting a group of codeblock segments to the user equipment, wherein the group of codeblock segments corresponds to a transport block segmented based on the codeblock segmentation rate.

16. The non-transitory machine-readable medium of claim 15, wherein the operations further comprise:
  transmitting an indication of the codeblock segmentation rate to the user equipment.

17. The non-transitory machine-readable medium of claim 15, wherein the operations further comprise:
  determining the codeblock segmentation rate further based on a distance of the user equipment from the network equipment.

18. The non-transitory machine-readable medium of claim 15, wherein the operations further comprise:
  determining the codeblock segmentation rate further based on a signal to interference plus noise measurement associated with the user equipment.

19. The non-transitory machine-readable medium of claim 15, wherein the operations further comprise:
  determining the codeblock segmentation rate further based on a speed of movement of the user equipment.

20. The non-transitory machine-readable medium of claim 15, wherein the operations further comprise:
  determining the codeblock segmentation rate further based on channel state information received from the user equipment.

* * * * *